US007665885B2

(12) United States Patent
Pryor, Jr.

(10) Patent No.: US 7,665,885 B2
(45) Date of Patent: *Feb. 23, 2010

(54) DISPENSING BLENDER

(75) Inventor: Ernest B. Pryor, Jr., Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 589 days.

This patent is subject to a terminal disclaimer.

(21) Appl. No.: 11/461,553

(22) Filed: Aug. 1, 2006

(65) Prior Publication Data
US 2008/0031087 A1 Feb. 7, 2008

(51) Int. Cl.
A47J 43/046 (2006.01)

(52) U.S. Cl. .................. 366/197; 366/199; 366/205

(58) Field of Classification Search ............ 366/194, 366/197, 199, 206, 605
See application file for complete search history.

(56) References Cited

U.S. PATENT DOCUMENTS

| 2,315,018 A | 3/1943 | Lawrence |
| 2,665,852 A | 1/1954 | Shively |
| 2,710,707 A | 6/1955 | Persak, Jr. |
| 3,100,588 A | 8/1963 | Pearson, Jr. |
| 3,455,332 A | 7/1969 | Cornelius |

(Continued)

Primary Examiner—Tony G Soohoo
(74) Attorney, Agent, or Firm—Panitch Schwarze Belisario & Nadel LLP

(57) ABSTRACT

A dispensing blender for blending foodstuff and dispensing foodstuff therefrom. The dispensing blender includes a base enclosing a motor, a jar removably mountable to the base, a collar removably mountable between the base and the jar and a dispensing spout mounted to the collar. At least a portion of the dispensing spout is movable to an open position wherein foodstuff within the jar is able to flow from the jar, through the collar and out of the dispensing spout and a closed position wherein the foodstuff is blocked from flowing out of the dispensing spout. A cup actuation lever mounted to the base is movable to a dispensing position wherein the dispensing spout is urged to the open position and a resting position wherein the dispensing spout is urged to the closed position. A switch is mounted to the base proximate to the cup actuation lever so that when the cup actuation lever is moved to the dispensing position, the switch is actuated to a closed condition by the cup actuation lever, the switch being electrically connected so that actuation of the switch to the closed condition causes the motor to operate to thereby rotate the tool when the dispensing spout is in the open position and foodstuff is flowing out of the dispensing spout.

6 Claims, 12 Drawing Sheets

U.S. PATENT DOCUMENTS

| | | | |
|---|---|---|---|
| 3,655,097 A | 4/1972 | Booth et al. | |
| 3,667,724 A | 6/1972 | Cornelius | |
| 3,920,224 A | 11/1975 | Fassauer | |
| 4,165,821 A | 8/1979 | Martin et al. | |
| 4,363,265 A | 12/1982 | Tanioka et al. | |
| 4,400,596 A * | 8/1983 | Fukukura et al. | 200/5 A |
| 4,513,688 A | 4/1985 | Fassauer | |
| 4,537,332 A | 8/1985 | Brown et al. | |
| 4,987,275 A * | 1/1991 | Miller et al. | 200/5 A |
| 5,129,434 A | 7/1992 | Whigham et al. | |
| 5,129,549 A | 7/1992 | Austin | |
| 5,257,575 A | 11/1993 | Harrison et al. | |
| 5,294,762 A * | 3/1994 | Kaizu et al. | 200/513 |
| 5,303,849 A | 4/1994 | Credle, Jr. | |
| 6,431,744 B1 | 8/2002 | Ash et al. | |
| 6,527,433 B2 | 3/2003 | Daniels, Jr. | |
| D473,421 S | 4/2003 | Daniels, Jr. | |
| 6,648,185 B1 | 11/2003 | Henry et al. | |
| 6,966,689 B2 | 11/2005 | Daniels, Jr. | |
| 7,422,361 B2 * | 9/2008 | Pryor et al. | 366/197 |
| 2002/0080678 A1 | 6/2002 | Daniels, Jr. | |
| 2003/0099154 A1 | 5/2003 | Daniels, Jr. | |
| 2004/0026222 A1 * | 2/2004 | Adachi | 200/512 |
| 2005/0045671 A1 | 3/2005 | Beesley et al. | |
| 2005/0185507 A1 | 8/2005 | Beesley et al. | |
| 2005/0199534 A1 | 9/2005 | Daniels, Jr. | |
| 2005/0207270 A1 | 9/2005 | Beesley | |
| 2007/0041268 A1 | 2/2007 | Beesley et al. | |

\* cited by examiner

DISPENSING BLENDER

BACKGROUND OF THE INVENTION

The present application is directed to a dispensing blender and, more particularly to a blender that includes a spout that dispenses foodstuff from a blender container without removing the container from the blender base and which further includes a switch which is automatically actuated to operate the blender motor when the foodstuff is dispensed.

Blenders are a relatively common household or kitchen appliance that are used to blend foodstuff, typically drinks or other foodstuff that is blended into a semi-fluid state. A typical blender includes a base that encloses a motor housing and a container comprised of a collar and a jar. The collar includes a blending tool rotatably mounted thereto. The blending tool is rotatably engageable with a drive shaft of the motor in an operating configuration. A foodstuff is placed into the container and the container is engaged with the base. The foodstuff is blended and the container is removed from the base to dispense or pour the blended foodstuff from the mouth of the jar.

Some blenders, in addition to blending foodstuff in the container permit the blended foodstuff to be dispensed directly into a cup or other receptacle without removing the container from the base or the lid from the mouth of the blender container. Additional foodstuff may then be inserted into the container and blended for continuous dispensing of the blended foodstuff from the container, without removing the container from the base. In addition, eliminating the step of removing the container from the base to dispense the blended foodstuff, in certain situations, eliminates the need to continuously replace the container onto the base to blend additional foodstuff. Further, a user is not required to tip and pour blended foodstuff out of the mouth of the relatively heavy container when the foodstuff is dispensed from the dispensing spout.

Such blenders generally include a cup actuated lever on the blender that opens a dispensing spout when the lever is actuated by the cup. The mouth of the cup may be positioned under the dispensing spout such that the blended foodstuff flows into the cup upon actuation of the lever.

It would be desirable to provide such a dispensing blender which includes a switch which is actuatable by the cup actuated lever to cause the motor to operate to thereby rotate the blending tool to foster the dispensing of the foodstuff.

BRIEF SUMMARY OF THE INVENTION

Briefly stated, a preferred embodiment of the present application is directed to a dispensing blender for blending foodstuff and dispensing foodstuff therefrom. The dispensing blender comprises a base enclosing a motor, a container removably mountable to the base and a motor drive shaft that extends out of the base. The container includes a clutch that releasably engages the drive shaft and a tool extending into the container in a working position, the tool being drivingly connected to the clutch such that rotation of the motor drive shaft results in rotation of the tool. A dispensing spout is mounted to the container, the dispensing spout being at either an open position wherein foodstuff within the container is able to flow out of the dispensing spout or a closed position wherein the foodstuff is blocked from flowing out of the dispensing spout. A cup actuation lever mounted to the base is movable to a dispensing position wherein the dispensing spout is urged to the open position and a resting position wherein the dispensing spout is urged to the closed position. A switch is mounted to the base proximate to the cup actuation lever so that when the cup actuation lever is moved to the dispensing position the switch is actuated to a closed condition by the cup actuation lever, the switch being electrically connected so that actuation of the switch to the closed condition causes the motor to operate to thereby rotate the tool when the dispensing spout is in the open position and foodstuff is flowing out of the dispensing spout.

BRIEF DESCRIPTION OF THE SEVERAL VIEWS OF THE DRAWINGS

The foregoing summary, as well as the following detailed description of preferred embodiments of the present application, will be better understood when read in conjunction with the appended drawings. For the purpose of illustrating the dispensing blender described in the present application, there is shown in the drawings, embodiments which are presently preferred. It should be understood, however, that the invention is not limited to the precise arrangements and instrumentalities shown. In the drawings.

In the drawings.

DETAILED DESCRIPTION OF THE INVENTION

Figure 1:
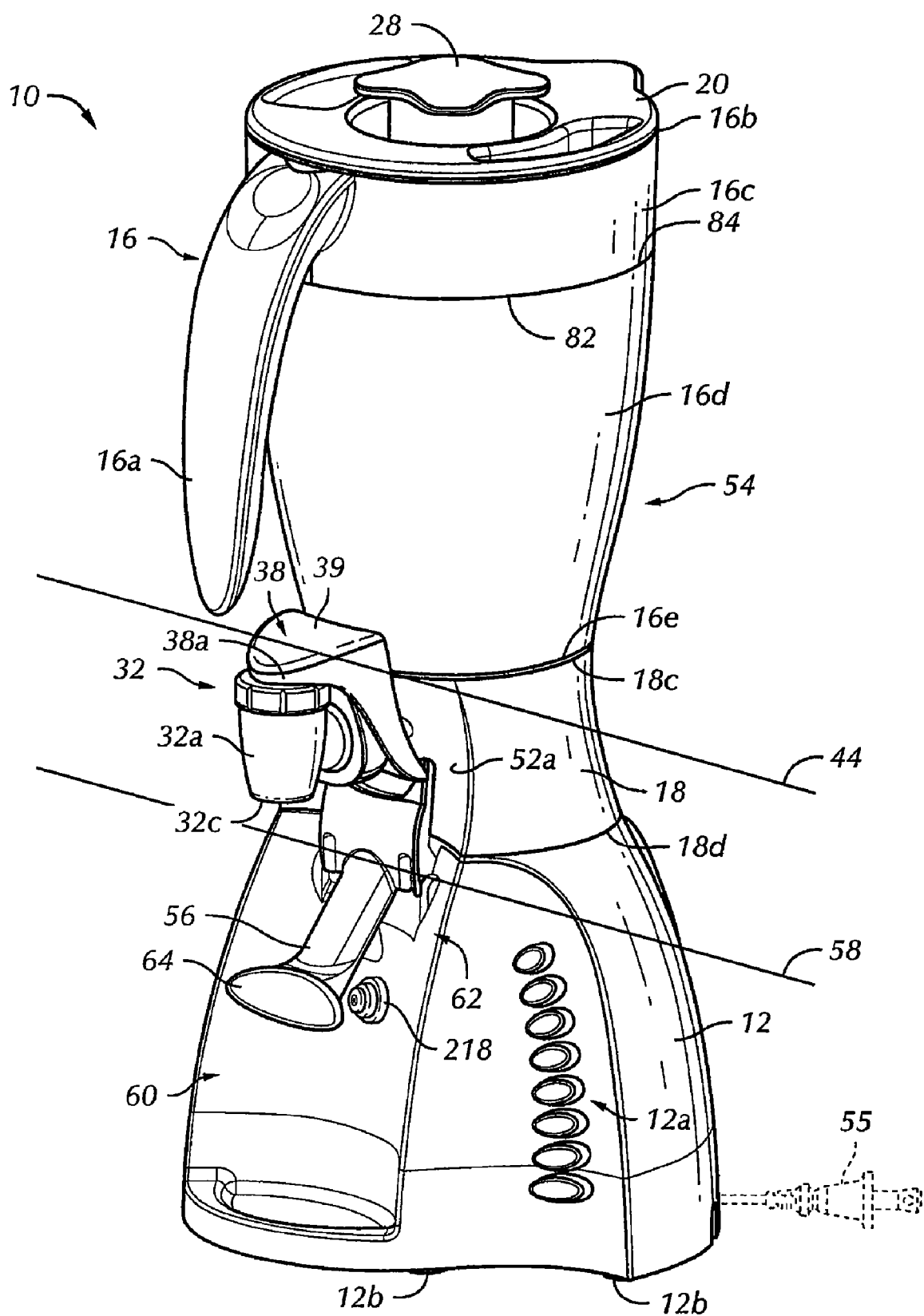
FIG. 1 is a front perspective view of a first embodiment of the dispensing blender of the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the dispensing blender and designated parts thereof. The terminology includes the above-listed words, derivatives thereof and words of similar import.

Referring to the drawings in detail, wherein like numerals indicate like elements throughout, there is shown in FIGS. 1-5, a preferred embodiment of a dispensing blender, generally designated 10, for blending foodstuff and dispensing foodstuff, particularly the blended foodstuff therefrom. The dispensing blender 10 includes a base 12 enclosing a motor 14, a jar 16 removably mountable to the base 12 and a collar 18 removably mountable between the base 12 and the jar 16.

In the preferred embodiment, the base 12 and the collar 18 are constructed of a generally rigid polymeric material that is able to withstand the normal operating conditions of the base 12 and the collar 18 and take on the general shape of the base 12 and the collar 18. Specifically, the base 12 and the collar 18 are preferably constructed of an injection molded polymeric material. One having ordinary skill in the art will realize that the base 12 and collar 18 are not limited to constructions comprised of an injection molded polymeric material and may be constructed of nearly any, generally rigid material that is able to take on the general shape and withstand the typical operating conditions of the base 12 and the collar 18.

The jar 16 is preferably constructed of a transparent, generally rigid material that is able to withstand the normal operating conditions of the jar 16. The preferred jar 16 is constructed of a generally rigid, injection molded polymeric material that is at least partially transparent such that foodstuff within the jar 16 may be viewed by a user. The preferred jar 16 also includes a handle 16a and a lid 20 that is removably mountable to a mouth 16b of the jar 16 to enclose foodstuff within the jar 16. The jar 16 is not limited to being constructed of a transparent material or to being constructed of an injection molded polymeric material and may be constructed of nearly any, generally rigid material that is able to take on the general shape of the jar 16 and withstand the normal operating conditions of the jar 16, for example, glass, stainless steel or aluminum.

In the preferred embodiment, the jar 16 is comprised of an inner jar 16c and an outer jar 16d. The inner jar 16c is removably mountable to outer jar 16d and the inner and outer jars 16c, 16d define an insulating cavity 81 when they are mounted to each other. The insulating cavity 81 is preferably defined between an outer surface of the inner jar 16c and an inner surface of the outer jar 16d in the assembled configuration. Air is preferably captured in the insulating cavity 81 and acts as an insulator to reduce heat conduction through the walls of the jar 16. Accordingly, relatively cold ingredients placed into the jar 16 typically retain their cold temperature longer when compared to a jar 16 having no insulating cavity 81 and, likewise, relatively hot ingredients retain their hot temperature comparatively longer when stored in the jar 16. The handle 16a is preferably integrally constructed with the inner jar 16c and extends from an upper portion of the inner jar 16c. However, the handle 16a may also be secured to the outer jar 16d or portions of the handle 16a may be constructed on both the inner and outer jars 16c, 16d. The inner and outer jars 16c, 16d are preferably dishwasher-safe. The jar 16 is not limited to constructions including the inner and outer jars 16c, 16d and may be constructed of a one-piece jar 16, as is typical in the blender jar art or other alternate constructions.

Figure 2:
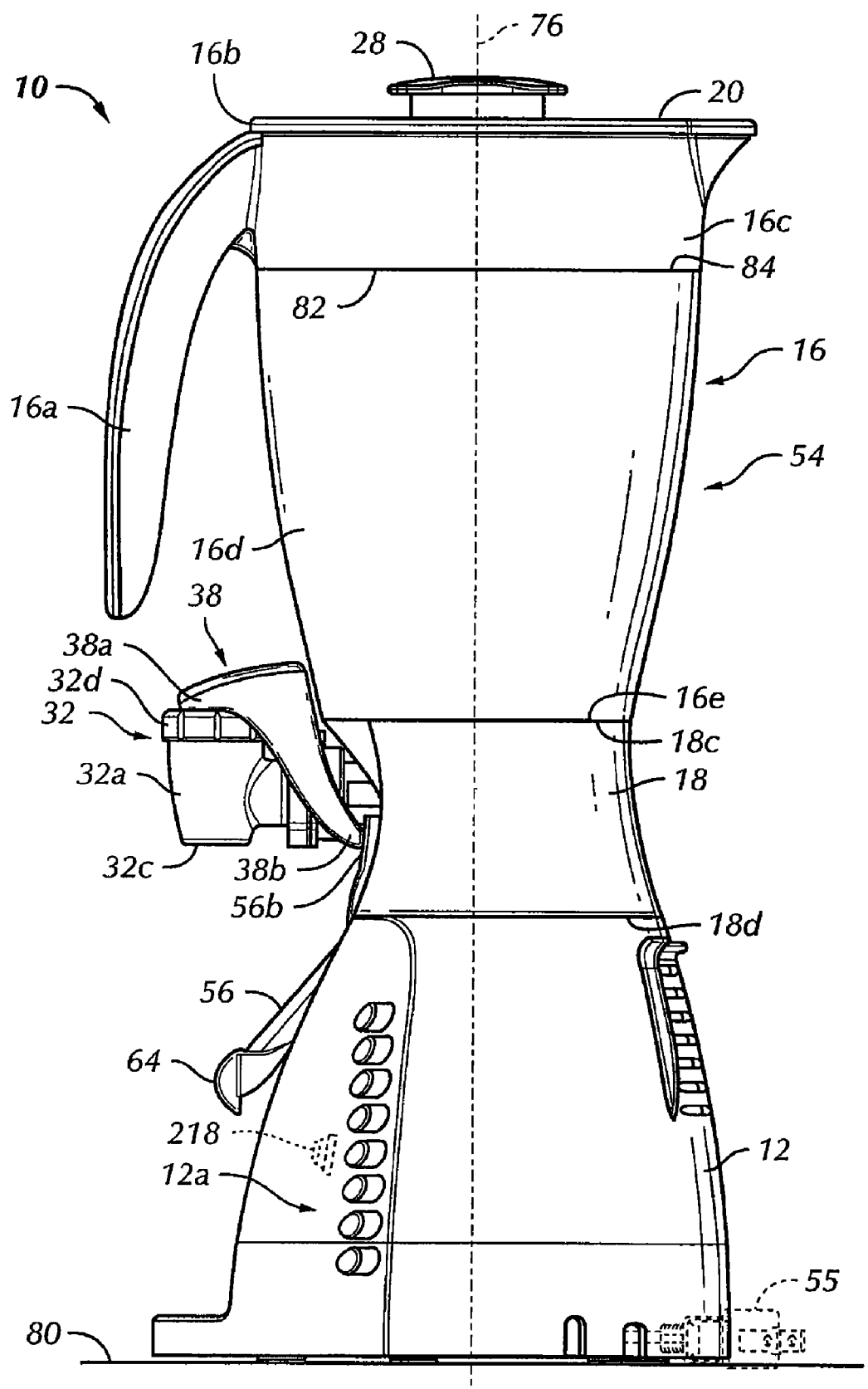
FIG. 2 is a right-side elevational view of the dispensing blender shown in FIG. 1.
Figure 3:
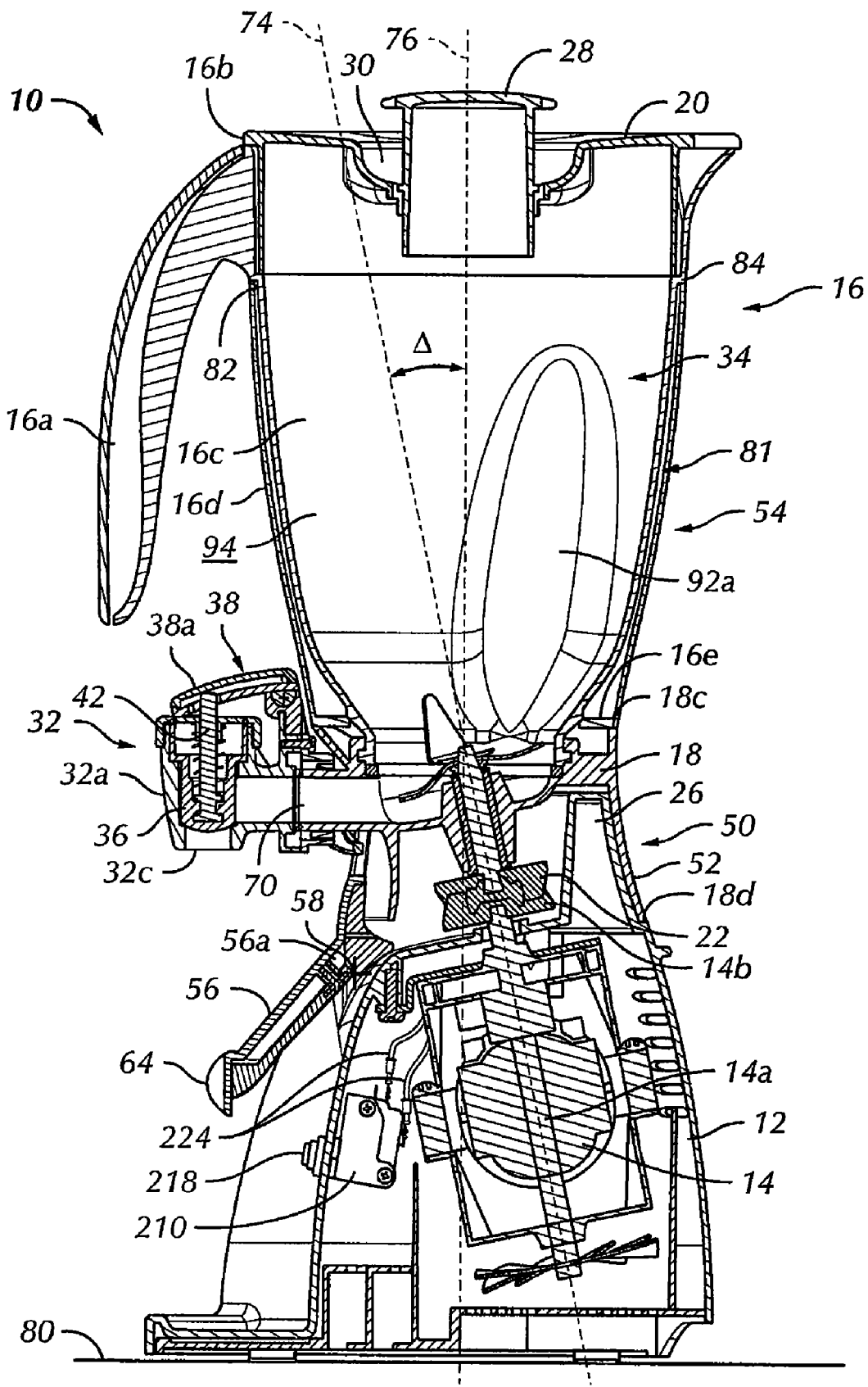
FIG. 3 is a cross-sectional view of the dispensing blender shown in FIG. 1, taken along line 3-3 of FIG. 1.

Referring to FIGS. 1-3, in the preferred embodiment, the outer jar 16d includes an upper end 82 and the inner jar 16c includes a locating ridge 84, which is preferably proximate the mouth 16b of the jar 16. When the inner jar 16c is mounted to the outer jar 16d, the locating ridge 84 is in facing engagement with the upper end 82. Mating of the locating ridge 84 and upper end 82 preferably results in a generally smooth, continuous external surface at the mating line between the inner and outer jars 16c, 16d. The outer jar 16d is removably mounted to the inner jar 16c by a mounting mechanism adjacent the upper end 82 of the outer jar 16d and the locating ridge 84 of the inner jar 16c. In the preferred embodiment, the mounting mechanism is comprised of twist-lock tabs 86a, 86b that extend radially outwardly from the inner jar 16c proximate the locating ridge 84 and radially inwardly from the outer jar 16d proximate the upper end 82. The twist-lock tabs 86a, 86b form a bayonet-type mounting mechanism that permits twist locking of the inner jar 16c to the outer jar 16d. Accordingly, the jar 16 is disassembled by twisting the inner jar 16c relative to the outer jar 16d in an unlocking direction and axially moving the inner jar 16c away from the upper end 82 of the outer jar 16d. The mounting mechanism is not limited to the twist-lock tabs 86a, 86b and may be comprised of nearly any mounting mechanism that is able to releasably mount the inner jar 16c to the outer jar 16d and withstand the normal operating conditions of the dispensing blender 10. For example, the mounting mechanism may be comprised of fasteners, clamps, hook and loop material or other like mounting mechanisms that would be obvious to one having ordinary skill in the art.

Figure 4:
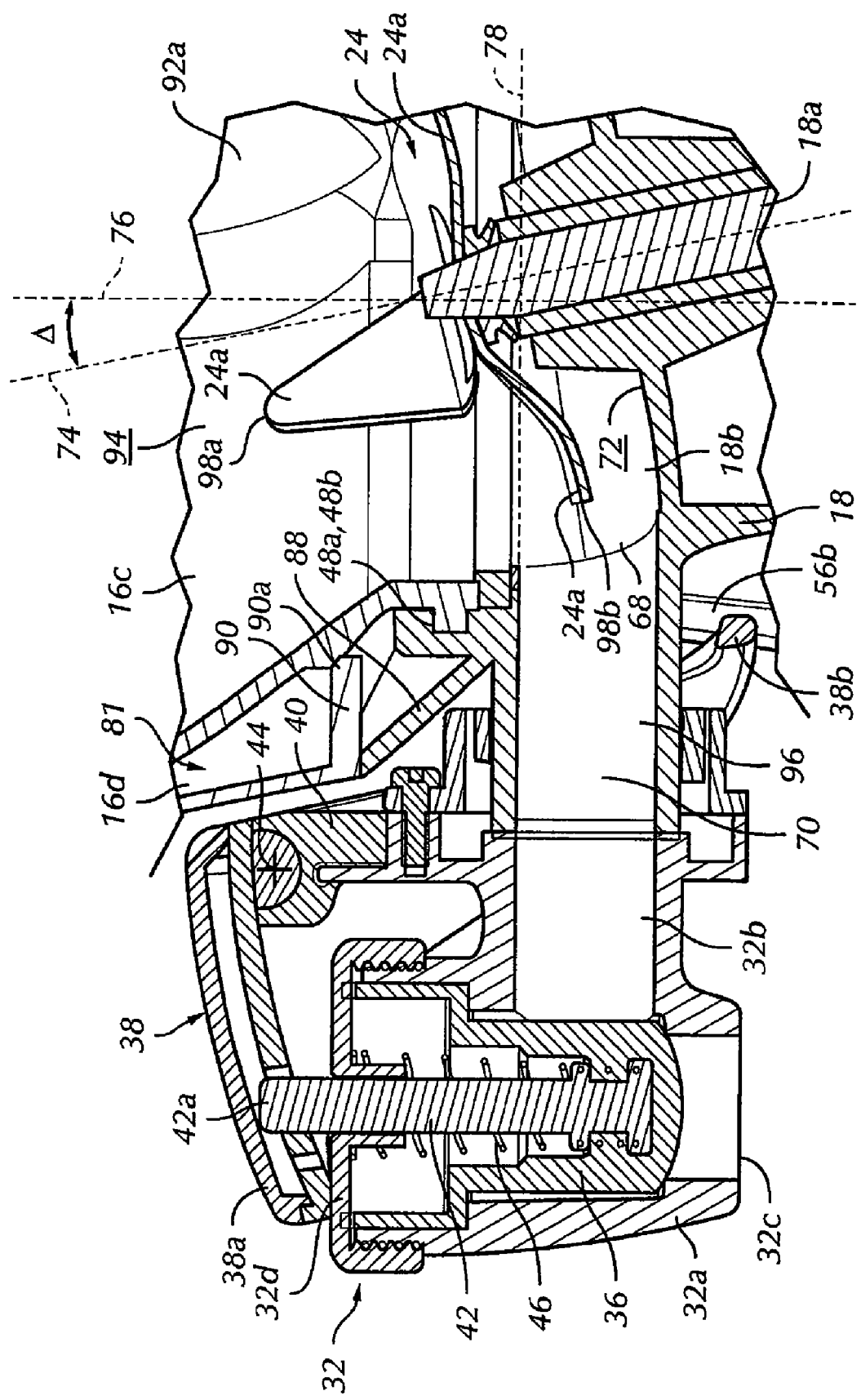
FIG. 4 is a greatly magnified, partial cross-sectional view of the dispensing blender shown in FIG. 3 with the dispensing spout in a closed position.
Figure 5:
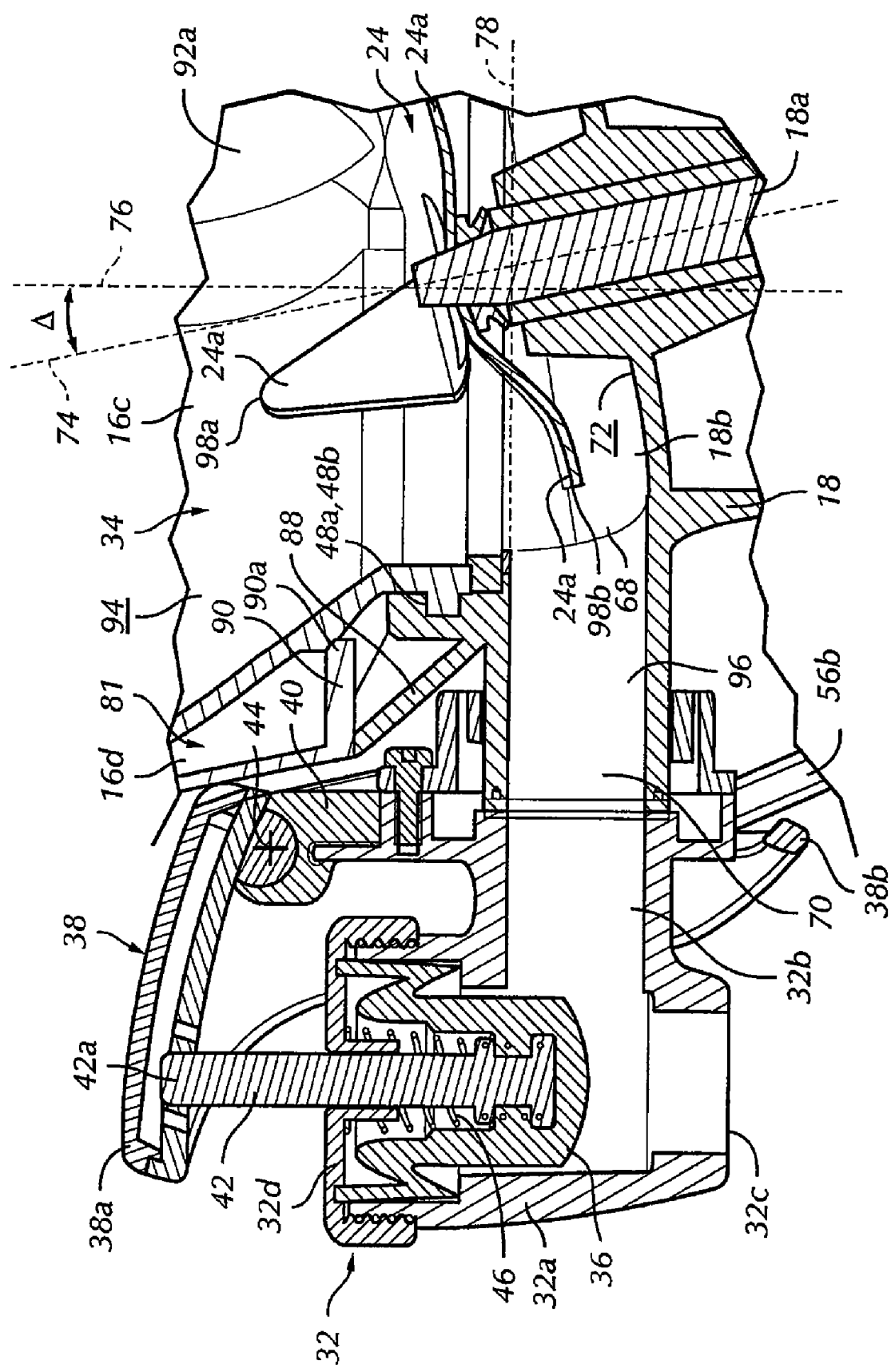
FIG. 5 is a greatly magnified, partial cross-sectional view of the dispensing blender shown in FIG. 3 with the dispensing spout in an open position.

Referring to FIGS. 4-5, in the preferred embodiment, the collar 18 includes an upper, peripheral rim 88 that is in close proximity to the outer jar 16d when the outer jar 16d is mounted to the inner jar 16c and the collar 18 is mounted to the jar 16. The outer jar 16d preferably includes a tab 90 including a terminal rim end 90a. The tab 90 defines a bottom of the insulating cavity 81 and preferably creates a generally smooth transition between the outer jar 16d and the collar 18 at its root end. The terminal rim end 90a is preferably in at least partial facing engagement with the inner jar 16c proximate its mounting end to generally close the insulating cavity 81 in the preferred embodiments. The dispensing blender 10 is not limited to the inclusion of the tab 90 to close the insulating cavity 81 or to inclusion of the outer jar 16d. For example, the dispensing blender 10 may be operated without mounting the outer jar 16d to the inner jar 16c by mounting the inner jar 16c to the collar 18 and mounting the collar to the base 12. However, inclusion of the outer jar 16d in the assembly is preferred to define the insulating cavity 81 such that the jar 16 and a mixing cavity 34 of the jar 16 are insulated. In addition, the insulating cavity 81 is not limited to being defined by the inner and outer jars 16c, 16d and may be constructed, for example, as a pocket integrally molded into a one-piece jar 16.

Referring to FIGS. 1-3, in the preferred embodiment, the jar 16 and collar 18 comprise a container 54 when the collar 18 is mounted to the jar 16. Foodstuff may be positioned in the container 54 through the mouth 16b for blending or storage of the foodstuff. The container 54 is positionable upon the base 12 in an operating position such that the foodstuff in the container 54 may be agitated or blended using a tool 24.

Referring to FIG. 3, in the preferred embodiment, the motor 14 includes a drive shaft 14a that extends out of the base 12 with a motor clutch 14b mounted on an end extending out of the base 12. The collar 18 includes a complementary clutch 22 that is mounted to a collar shaft 18a. The clutch 22 releaseably engages the motor clutch 14b of the drive shaft 14a in a working position. The tool 24 is mounted to an opposite end of the collar shaft 18a and extends into the mixing cavity 34 of the container 54 in the working position. The tool 24 is drivingly connected to the motor 14 through the clutches 14b, 22 such that rotation of the drive shaft 14a results in rotation of the tool 24. The drive shaft 14a is not limited to being rotatably connected to the collar shaft 18a through the clutch 22 and the motor clutch 14b and may be rotatably connected to the collar shaft 18a through nearly any rotatable connection that transmits rotation of the motor shaft 14a through the collar shaft 18a and into the tool 24, for example, a gearing mechanism.

The preferred tool 24 and clutch 22 are mounted to opposite ends of the collar shaft 18a and the collar shaft 18a is rotatably mounted in the collar 18 in a generally central location. When the collar 18 is mounted to the base 12 in the working position, the clutch 22 engages the opposing motor clutch 14b and when the motor 14 drives the drive shaft 14a, the motor clutch 14b drives the clutch 22, which drives the collar shaft 18a and the tool 24 to blend foodstuff within the container 54.

Figure 6:
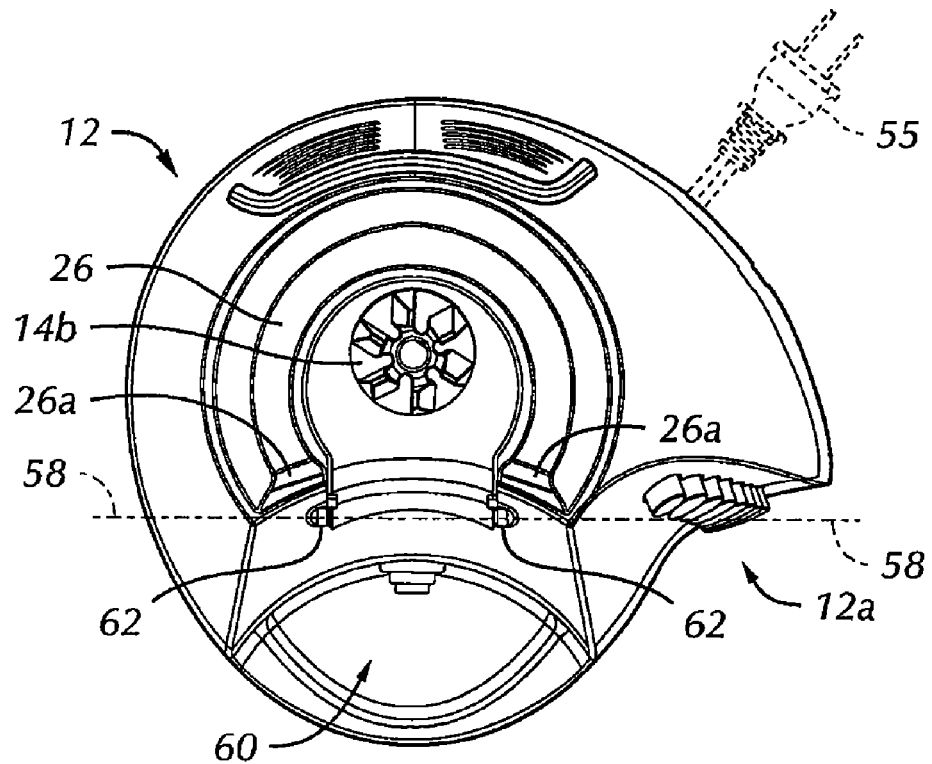
FIG. 6 is a top plan view of a base of the dispensing blender of FIG. 1.
Figure 7:
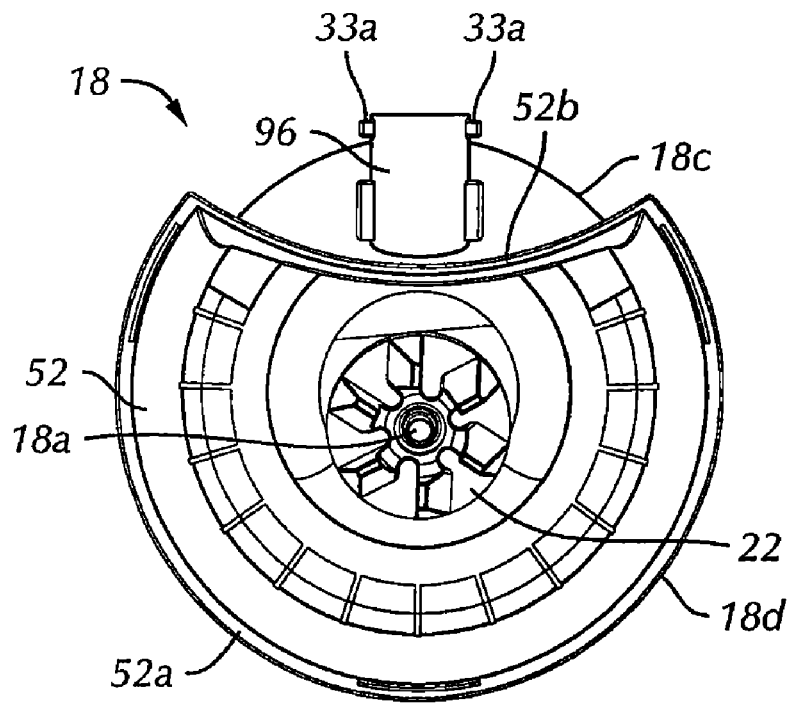
FIG. 7 is a bottom plan view of a collar of the dispensing blender of FIG. 1.

Referring to FIGS. 3, 6 and 7, in the preferred embodiment, the base 12 includes an upwardly extending wall 26 that extends at least partially around the motor clutch 14b at the top of the base 12 and engages the collar 18 such that the collar 18 is mountable to the base 12, preferably in one orientation. The upwardly extending wall 26 preferably has a horseshoe-shape in a top plan view with two ends 26a. The collar 18 includes a peripheral wall 52 having a generally semi-circular portion 52a and a generally concave portion 52b adjacent its front. The upwardly extending wall 26 engages the peripheral wall 52 to releasably mount the collar 18 to the base 12 in the working position and generally prevent significant movement of the collar 18 relative to the base 12. Specifically, the engagement generally limits pivotal movement of the collar 18 relative to the base 12 about the vertical axis 76. Pivotal movement is generally limited by engagement between the ends 26a of the upwardly extending wall 26 and a transition between the semi-circular portion 52a and concave portion 52b of the peripheral wall 52. The collar 18 is not limited to being removably mounted to the base 12 in a preferred orientation through the upwardly extending wall 26 and the peripheral wall 52 and may be mounted to the base 12 using nearly any mounting mechanism including adhesive bonding, clamping, complementary ribs and grooves, bayonet locking or other like mounting mechanisms.

Referring to FIGS. 1-3, the preferred lid 20 includes a filler cap 28 that is removably mountable within a filler hole 30 of the lid 20. The cap 28 may be removed and replaced from and into the filler hole 30 so that foodstuff or other ingredients may be inserted into the jar 16 during operation without removing the lid 20 from the jar 16. In addition, the filler cap 28 may be replaced into the filler hole 30 after ingredients have been inserted into the jar 16 such that blending foodstuff is not thrown from the filler hole 30. The jar 16 is not limited to the inclusion of the lid 20 nor is the lid 20 limited to the inclusion of the cap 28, as will be understood by one having ordinary skill in the art. For example, the dispensing blender 10 may be configured with a jar 16 having an open mouth 16b and no lid 20, preferably if the tool 24 does not rotate at a speed that may cause blending foodstuff to be thrown out of the mouth 16b.

Referring to FIGS. 1-5, in the preferred embodiment, a dispensing spout 32 is mounted to the collar 18. At least a portion of the dispensing spout 32 is movable to an open position (FIG. 5) wherein blended or other foodstuff within the jar 16 is able to flow from the jar 16, through the collar 18 and out of the dispensing spout 32 and a closed position (FIGS. 3 and 4) wherein the blended foodstuff is blocked from flowing out of the dispensing spout 32. In the preferred embodiment, the dispensing spout 32 includes a dispensing head 32a with a spout mouth 32c, a spout lid 32d that is mounted to a valve pin 42 and a stop valve 36 and a dispensing pipe 32b. The spout lid 32d is preferably removably mountable to the head 32a by a set of threads. The dispensing head 32a, spout lid 32d and dispensing pipe 32b are preferably constructed of a polymeric material and the head 32a and pipe 32b are generally hollow. The hollow portions of the head 32a and pipe 32b form at least a portion of a channel 70 that is in fluid communication with a basin 18b of the collar 18 in an assembled configuration. The basin 18b is preferably located at the lowest portion of the mixing cavity 34 adjacent the tool 24 in the assembled configuration. The dispensing spout 32 is not limited to being constructed of a polymeric material and may be constructed of nearly any material that is able to take on the general shape of the dispensing spout 32 and withstand the normal operating conditions of the dispensing spout 32. For example, the dispensing spout 32 may be constructed of a metallic material.

In the preferred embodiment, the dispensing spout 32 is removably mountable to the collar 18 such that the dispensing spout 32 may be separated from the dispensing blender 10 for cleaning purposes. The pipe 32b of the dispensing spout 32 preferably includes a fastening mechanism (not shown) that mates with a complementary fastening mechanism 33a on a pipe 96, which extends from the collar 18. The pipe 96 is generally hollow and is in communication with the basin 18b. The preferred fastening mechanisms 33a between the pipe 96 of the collar 18 and the pipe 32b of the dispensing spout 32 permit twist-locking of the dispensing spout 32 to the collar 18. Specifically, the most preferred fastening mechanisms 33a permit engaging and disengaging of the dispensing spout 32 relative to the collar 18 by one-quarter twist engagement. One-quarter twist engagement is preferred such that the dispensing spout 32 is quickly and easily removable from the collar 18, when compared to a threaded fastening mechanism that may require multiple rotations or twists to engage and/or disengage the dispensing spout 32 from the collar 18. However, the fastening mechanisms are not limited to one-quarter twist engagements and may be comprised of nearly any fastening device that permits removable mounting of the dispensing spout 32 relative to the collar 18. In addition, one having ordinary skill in the art will realize that the dispensing spout 32 may be fixed to the collar 18.

The dispensing spout 32 is not limited to being mounted to the collar 18 and may be mounted to the jar 16 such that foodstuff may be dispensed from the mixing cavity 34. However, mounting of the dispensing spout 32 to the collar 18 is preferred such that the pipe 32b is at the same lever or below a lowest portion of the mixing cavity 34 and any hole or penetration in the container 54 is in the collar 18. Mounting the dispensing spout 32 in the collar 18 eliminates the introduction of a hole in the jar 16 and the need to seal the hole. For example, if a glass jar 16 is utilized and the dispensing spout 32 is mounted to the jar 16, introduction of a hole in a glass jar 16 is typically difficult and may be difficult to seal. Further, utilizing a double-walled jar 16 for insulating purposes with the dispensing blender 10 would necessitate introduction of two holes through the walls of the inner and outer jars 16c, 16d, which is typically more difficult that the introduction of a single hole. Accordingly, the dispensing spout 32 is preferably mounted to the collar 18 as opposed to the jar 16 but is not so limited.

Figure 1A:
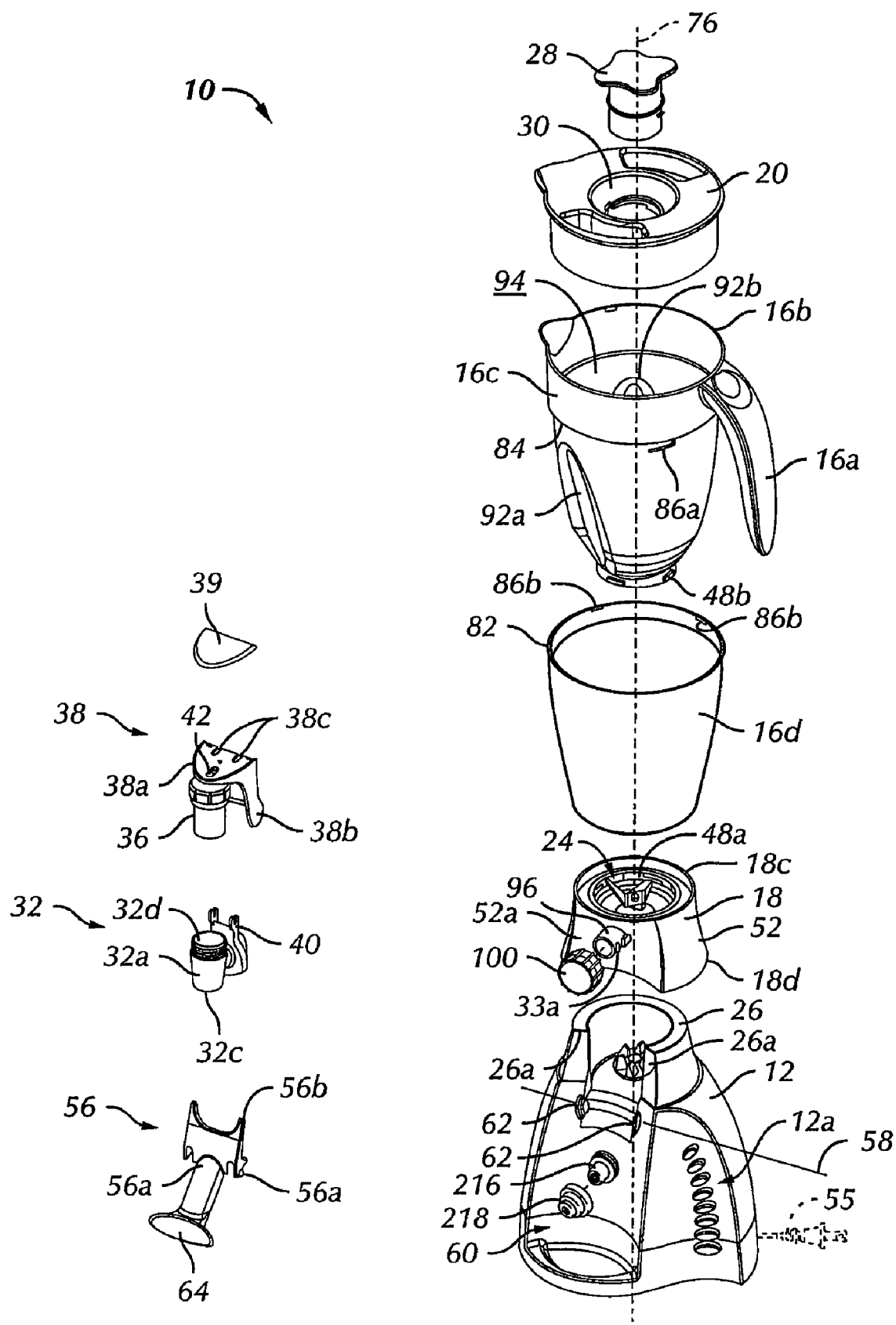
FIG. 1A is a partially exploded perspective view of the dispensing blender shown in FIG. 1.

Referring to FIG. 1A, in the preferred embodiment, a spout cap 100 is removably mountable to the pipe 96 through releasable engagement with the fastening mechanisms 33a. The spout cap 100 is preferably releasably mounted to the pipe 96 through the same one-quarter twist engagement, but is similarly not so limited. The spout cap 100 is mounted to the pipe 96 when the spout 32 is not utilized. The spout cap 100 blocks the flow of fluid from the pipe 96 and basin 18b during blending and otherwise permits operation of the dispensing blender 10 in the manner of a typical blender, as would be obvious to one having ordinary skill in the art.

Referring to FIGS. 3-5, the stop valve 36 is preferably vertically slideable within the dispensing head 32a between the closed position, wherein blended foodstuff is blocked from flowing out of the spout mouth 32c and the open position, wherein the blended foodstuff within the jar 16 is able to flow from the jar 16, through the basin 18b, through the dispensing pipe 32b, beyond the stop valve 36 and out of the mouth 32c. The stop valve 36 is preferably constructed of a generally flexible, polymeric material, such as a rubber-type material, but is not so limited. In the preferred embodiments, the stop valve 36 blocks the channel 70 in the closed position and slides out of the channel 70 in the open position.

Referring to FIGS. 1-5, in the preferred embodiment, a first actuation lever 38 is mounted to the dispensing spout 32 through a hub 40. The first actuation lever 38 is movable to a dispensing position (FIG. 5) wherein the lever 38 urges the dispensing spout 32 to the open position and to a resting position (FIGS. 1-3) wherein the lever 38 urges the dispensing spout 32 to the closed position. In the preferred embodiments, the first actuation lever 38 is pivotally mounted to the dispensing spout 32 such that it is pivotable between the dispensing and resting positions.

The first actuation lever 38 is preferably pivotally mounted to the hub 40, which extends generally upwardly from the dispensing pipe 32b. The first actuation lever 38 preferably includes an actuation shaft 38c that is snap-fit onto the hub 40 such that the lever 38 is pivotably and removably mounted to the hub 40. The first actuation lever 38 also preferably includes a cover 39 that shields the actuation shaft 38c and hub 40 from a user in the assembled configuration and generally prevents foreign objects from contacting the actuation shaft 38c and hub 40. The valve end 38a of the first actuation lever 38 is preferably positioned above the dispensing spout 32 in the assembled configuration and is mounted to the valve pin 42, which is engaged with the stop valve 36. The first actuation lever 38 is preferably removably mounted to the dispensing spout 32 by a snap-fit between the actuation shaft 38c and hub 40. In addition, the threads between the dispensing head 32a and the spout lid 32d may be released such that the valve pin 42 and stop valve 36 may be removed from the head 32a with the first actuation lever 38. Therefore, the first actuation lever 38, valve pin 42 and stop valve 36 may be removed from and replaced onto the container 54 for cleaning purposes. The first actuation lever 38 is not limited to being removably mounted to the hub 40 via the above-described snap-fit and may be fixed or otherwise mounted to the dispensing spout 32. However, removable snap-fitting of the first actuation lever 38 to the hub 40 is preferred such that the components may be quickly separated for cleaning purposes.

The first actuation lever 38 is preferably mounted to the dispensing spout 32 such that when the valve end 38a pivots about a first axis 44, the valve pin 42 moves relative to the dispensing head 32a and the stop valve 36 moves with the valve pin 42. Accordingly, when the first actuation lever 38 is positioned in the dispensing position, the valve end 38a is pivoted away from the dispensing spout 32, moving the valve pin 42 and stop valve 36 upwardly in the dispensing head 32a. In this dispensing position of the first actuation lever 38, the dispensing spout 32 is in the open position and the channel 70 is open because the stop valve 36 is moved out of the channel 70. In contrast, when the first actuation lever 38 is in the resting position (FIGS. 3 and 4), the valve end 38a is positioned adjacent the dispensing head 32a and the pin 42 and stop valve 36 are in a blocking or closed position. One having ordinary skill in the art will realize that the specific stop valve 36 and valve pin 42 are not limiting and the dispensing blender 10 may utilize nearly any valve or other mechanism that is able to selectively block fluid flow through the channel 70.

In the preferred embodiment, the dispensing spout 32 is biased toward the closed position and the first actuation lever 38 is biased toward the resting position by a spring 46. The preferred spring 46 is comprised of a compression spring associated with the stop valve 36 and applies a force between the spout lid 32d of the dispensing spout 32 and either the pin 42 or the stop valve 36 to urge the dispensing spout 32 to the closed position. Therefore, in the preferred embodiment, the dispensing spout 32 is biased toward the closed position by the spring 46 and the first actuation lever 38 is biased toward the resting position by the spring 46. The dispensing blender 10 is not limited to the inclusion of the spring 46 and may employ nearly any mechanism that is able to selectively open and close the dispensing spout 32. For example, the stop valve 36 may be constructed of a spring-like material that urges the stop valve 36 toward the closed position or the stop valve 36 may be electronically actuated between the open and closed positions.

Referring to FIGS. 1A, 3, 4, 6 and 7, in the preferred embodiment, the collar 18 includes a first end 18c and a second end 18d. A first coupling mechanism 48 is located at the first end 18c and a second coupling mechanism 50 is located at the second end 18d. The first coupling mechanism 48 removably mounts the collar 18 to the jar 16 at a jar base 16e through a coupling tab 48b and the second coupling mechanism 50 removably mounts the collar 18 to the base 12.

In the preferred embodiment, the first coupling mechanism 48 is comprised of a bayonet-type lock that removably mounts the jar 16 to the collar 18. The bayonet-type lock is preferably comprised of the coupling tabs 48b proximate a mounting end of the inner jar 16c and bayonet-type grooves 48a proximate the basin 18d. The bayonet-type lock preferably seals the mixing cavity 34 such that blending or blended foodstuff does not leak from between the collar 18 and jar 16. The bayonet-type lock is not limiting and may be comprised of nearly any mounting mechanism that removably mounts the jar 16 to the collar 18 and is able to withstand the normal operating conditions of the dispensing blender 10.

The second coupling mechanism 50 is preferably comprised of the lower peripheral wall 52 of the collar 18 and the upwardly extending wall 26 of the base 12. The second coupling mechanism 50 is not limited to the above-described complimentary walls 26, 52 of the base 12 and collar 18, respectively. The second couplings mechanism 50 may be comprised of nearly any coupling mechanism that is able to removably mount the collar 18 to the base 12. For example, the base 12 may include ribs (not shown) that extend into slots (not shown) in the collar 18 to removably mount the collar 18 to the base 12.

Referring to FIGS. 1-3 and 6, in the preferred embodiment, a cup actuation lever 56 is mounted to the base 12 and is movable to a dispensing position wherein the dispensing spout 32 is urged to the open position and a resting position wherein the dispensing spout 32 is urged to the closed position. The cup actuation lever 56 is preferably pivotally mounted to the base 12 on a cup axis 58 by a yoke 62 that engages the cup actuation lever 56 at a pair of pivot nubs 56a. The pivot nubs 56a are preferably snap-fit into the yoke 62 such that the cup actuation lever 56 is pivotable about the cup axis 58, but is not so limited. The preferred cup actuation lever 56 also includes a generally concave, oval-shaped cup bumper 64 and an engagement end 56b opposite the bumper 64. In the working position, the engagement end 56b is in sliding engagement with a lever end 38b of the first actuation lever 38. When the cup actuation lever 56 pivots about the cup axis 58 from the resting position to the dispensing position, the engagement end 56b pivots away from the collar 18, contacts the lever end 38b and urges the lever end 38b away from the collar 18. This movement causes the first actuation lever 38 to pivot about the first axis 44 from the resting position to the dispensing position. Therefore, by manipulating the cup actuation lever 56 in this manner, the first actuation lever 38 pivots to move the dispensing spout 32 between the closed and open positions. In addition, the preferred cup actuation lever 56 is biased to the resting position by the spring 46, pin 42 and first actuation lever 38 in the working position. The cup actuation lever 56 is also preferably biased to the resting position when the collar 18 is not mounted to the base 12 by a spring (not shown) that typically prevents the cup bumper 64 from contacting a surface of the base 12 within a cup relief section 60.

Figure 8:
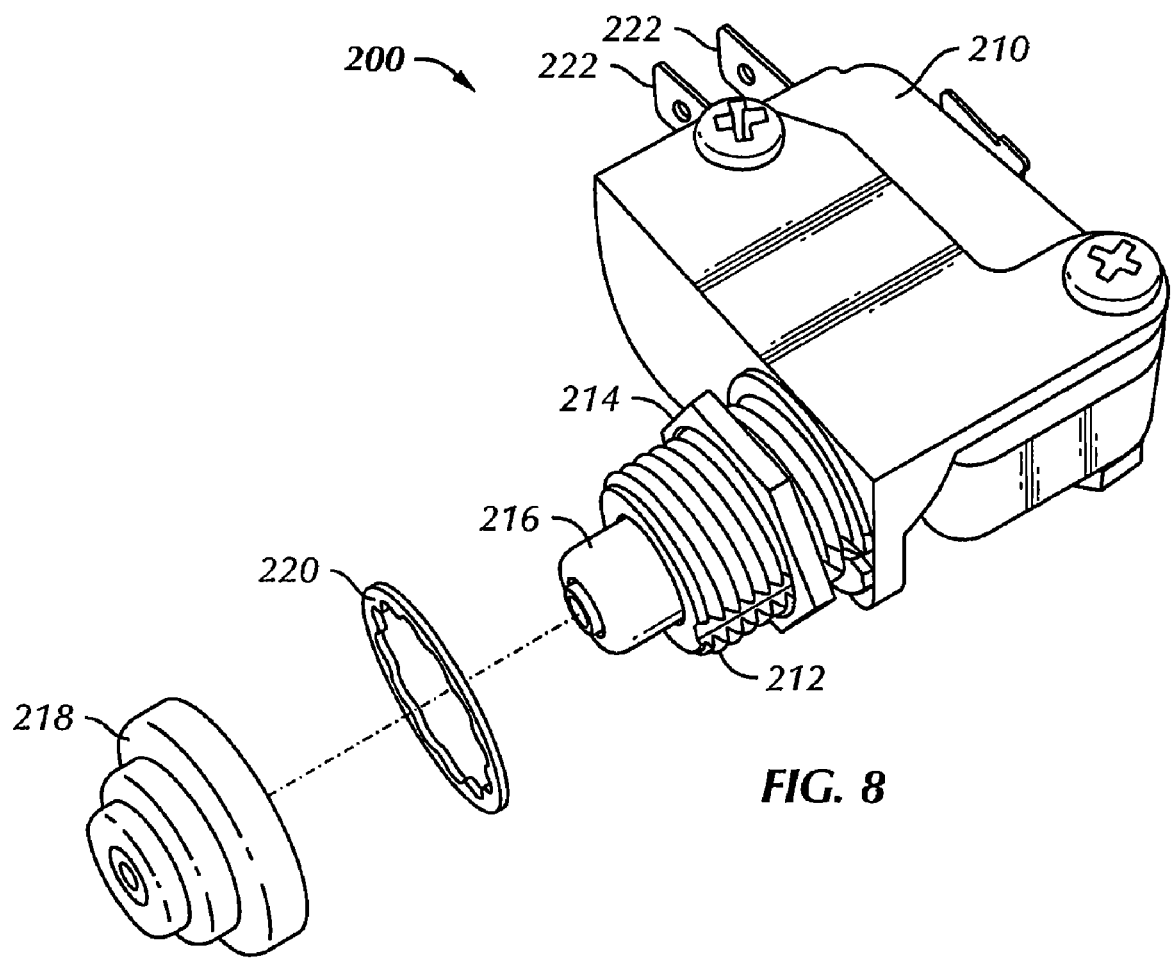
FIG. 8 is an exploded perspective view of a preferred switch mechanism for automatically actuating the motor when foodstuff is dispensed.

Referring to FIGS. 1, 1A, 3 and 8, a switch mechanism 200 is located in the base 12. In the present embodiment, the switch mechanism 200 is comprised of a housing 210 with an outwardly extending threaded generally tubular attachment member 212. A generally cylindrical push button actuator 216 extends through the central bore of the tubular attachment member 212. A pair of electrical contacts 222 extends outwardly from a side of the housing 210. The switch mechanism 200, in the present embodiment is of the momentary push button type which is well known in the art and available from various manufacturers. In particular, normally open electrical contacts (not shown) within the housing 212 are arranged so that when the push button actuator 216 is pushed into the tubular attachment member 212, the electrical contacts within the housing are closed to thereby electrically connect the external contacts 222. As long as the push button actuator 216 remains pushed inwardly, the external contacts 222 remain electrically connected together. The push button actuator 216 is biased so that when no external pressure is applied, it moves outwardly with respect to the tubular attachment member 212 to the extended position as shown in FIG. 8. When the push button actuator is in the extended position, the electrical contacts (nor shown) within the housing 210 revert to the open position and the external electrical contacts 222 are no longer electrically connected together.

The switch mechanism 200 is installed in the blender base 12 with the tubular attachment member 212 extending through a suitably sized circular opening (not shown) in the base 12 so that at least a portion of the tubular attachment member 212 and the push button actuator 216 extend at least slightly outside of the base 12 as shown in FIG. 1A proximate to and preferably beneath the cup actuator lever 56. Preferably the switch mechanism 200 is retained in place within the base 12 by a nut 214 and washer 220 which engage the threads on the exterior surface of the tubular attachment member 212. As shown in FIG. 3, a pair of wires 224 is connected between the external contacts 222 of the switch mechanism 200 and the electrical contacts (not shown) of a selected one of the push buttons on the control panel 12a. In this manner, the switch mechanism 200 is electrically connected in parallel with the selected control panel push button so that actuation of the switch mechanism 200 as described above has the same effect as pushing the selected control panel push button. Accordingly, actuation of the switch mechanism 200 by depressing the push button actuator 216 results in the operation of the blender motor 14 for rotation of the tool 24 at the same speed as though the selected control panel push button had been depressed.

The switch mechanism 200 further includes a protective member 218 which covers the push button actuator 216 and the portion of the tubular attachment member 214 which extends out of the blender base 12. In the present embodiment, the protective member 218 is formed of an electrometric material such as rubber and is comprised of a three step coaxial generally cylindrical hollow member having internal threads (not shown) which engage the external threads of the attachment member 212 for retaining the protective member 218 in place as shown in FIGS. 1 and 3. The protective member 218 prevents foodstuffs from contaminating the switch mechanism 200.

As can be seen in FIGS. 1, 2, 3 and 6, the switch mechanism 200 is located so that the protective member 218 and thus the push button actuator 216 are beneath the cup actuator lever 56. In this manner, when the cup actuator lever 56 is pushed downwardly to the dispensing position for the dispensing of foodstuff from the jar 16 as described above, the underside of the cup actuator lever 56 engages the protective member 218 and depresses the push button actuator 216 for actuation of the motor 14 as described above. As long as the cup actuator lever 56 remains in the dispensing position, the push button actuator 216 remains depressed and the motor 14 continues to operate so that the tool 24 rotates to assist in the dispensing of the foodstuff. When the cup or other container has been filled, the cup actuator lever 56 moves upwardly, disengaging from the protective member 218 to thereby open the switch mechanism 200 to turn off the motor 14. It will be appreciated that other types of switch mechanisms having different structures could alternatively be employed with the same or similar operational results.

Referring to FIG. 1A, in the preferred embodiment, the filler cap 28, lid 20, inner jar 16c, outer jar 16d, collar 18, first actuation lever 38 which is secured to the stop valve 36 and valve pin 42, dispensing spout 32 and cup actuation lever 56 are separable as individual components and are dishwasher-safe. Accordingly, these components of the dispensing blender 10 may be disassembled and placed into a dishwasher for cleaning. The components may then be configured in the assembled configuration on the base 12 for use. Accordingly, the base 12 is preferably the only component of the dispensing blender 10 that generally is not dishwasher-safe but is not so limited.

Referring to FIGS. 3-5, in the preferred embodiments, the channel 70 is defined by the hollow in the dispensing pipe 32b and dispensing head 32a and a hollow in a pipe 96 in the collar 18 leading from the basin 18b to the dispensing spout 32. A hole 68 in the basin 18b separates the pipe 96 from the basin 18b. The stop valve 36 selectively opens and closes the channel 70 to either selectively prevent foodstuff from flowing out of the jar 16 or basin 18b through the mouth 32c. Blended foodstuff or other ingredients within the basin 18b may flow through the hole 68 and channel 70 when the dispensing spout 32 is in the open position. In addition, the dispensing spout 32 is preferably removably mounted to the pipe 96 for cleaning purposes.

Referring to FIGS. 4 and 5, in the preferred embodiment, the basin 18b includes a pitched surface 72 at its bottom that urges blended foodstuff toward the hole 68 and channel 70 through the force of gravity. In the preferred embodiments, the hole 68 is located at the lowest portion of the basin 18b such that preferably all of the foodstuff from the mixing cavity 34 is eventually urged by the force of gravity along the pitched surface 72 toward the hole 68. Therefore, blended foodstuff is typically not stuck in the basin 18b. The basin 18b is not limited to the inclusion of the pitched surface 72 and may include a generally horizontal or cone-shaped surface, without significantly impacting the operation of the dispensing blender 10. However, the pitched surface 72 is preferred such that foodstuff is generally not blocked or stuck in the basin 18b because of the geometry of the basin 18b and/or the location of the hole 68 with respect to the basin 18b.

In the preferred embodiment, the collar shaft 18a and drive shaft 14a extend coaxially along a drive axis 74 in the working position. The drive axis 74 is located generally perpendicular relative to the pitched surface 72. In the preferred embodiment, the drive axis 74 is pitched at a basin angle Δ (FIG. 3) relative to the vertical axis 76. The preferred basin angle Δ is between approximately five and fifteen degrees (5 and 15°) but is not so limited. For example, the drive axis 74 may be positioned along the vertical axis 76 or may be pitched relative to the vertical axis 76 at a greater or smaller angle than the above-described preferred basin angles Δ.

In the preferred embodiment, at least a portion of a blending blade 24a of the tool 24 extends below a generally horizontal plane 78 of an upper edge of the hole 68 and channel 70 such that the tool 24 urges blended foodstuff into the hole 68 and channel 70 when the tool 24 is driven. That is, the blending blade 24a, which extends below the horizontal plane 78, directly urges blended foodstuff from the basin 18b, through the hole 68 and into the channel 70. If the blending blade 24a is positioned above the horizontal plane 78, the blade 24a typically urges foodstuff directly toward a side of the jar 16 or an upper portion of the basin 18b, but generally not directly into the hole 68. One having ordinary skill in the art will appreciate that the positioning of the blending blade 24a below the horizontal plane 78 is a preferred configuration and the dispensing blender 10 will operate without the blending blade 24a being positioned below the horizontal plane 78. In addition, the pitch of the tool 24 relative to the vertical axis 76 along drive axis 74 enhances the urging of the blending foodstuff toward the hole 68, as will be understood by one having ordinary skill in the art.

In the preferred embodiment, the tool 24 includes at least two blending blades 24a. The blending blades 24a include an upwardly extending blade tip 98a and at least one downwardly extending blade tip 98b and the downwardly extending blade tip 98b extends to a position below the horizontal plane 78 proximate a mid-point of the hole 68 as the blades 24a rotate about the drive axis 74. In the preferred embodiment, the tool 24 includes two blending blades 24a, one of which includes two upwardly extending blade tips 98a and one of which includes at least one downwardly extending blade tip 98b. In the preferred embodiment, the at least one downwardly extending blade tip 98b extends proximate the mid-point of the hole 68 as the associated blade 24a rotates about the drive axis 74. Specifically, the pitch of the drive axis 74 and the at least one downwardly extending blade tip 98b results in the blade tip 98b extending to the position proximate the mid-point of the hole 68. Accordingly, the downwardly extending blade tip 98b and a portion of the associated blade 24a radially inwardly from the downwardly extending blade tip 98b urge blending foodstuff directly into the hole 68 and channel 70 as the tool 24 rotates on the drive axis 74. Urging blending foodstuff directly into the hole 68 is preferred to promote dispensing of the foodstuff from the mixing cavity 34 and basin 18b.

Figure 9:
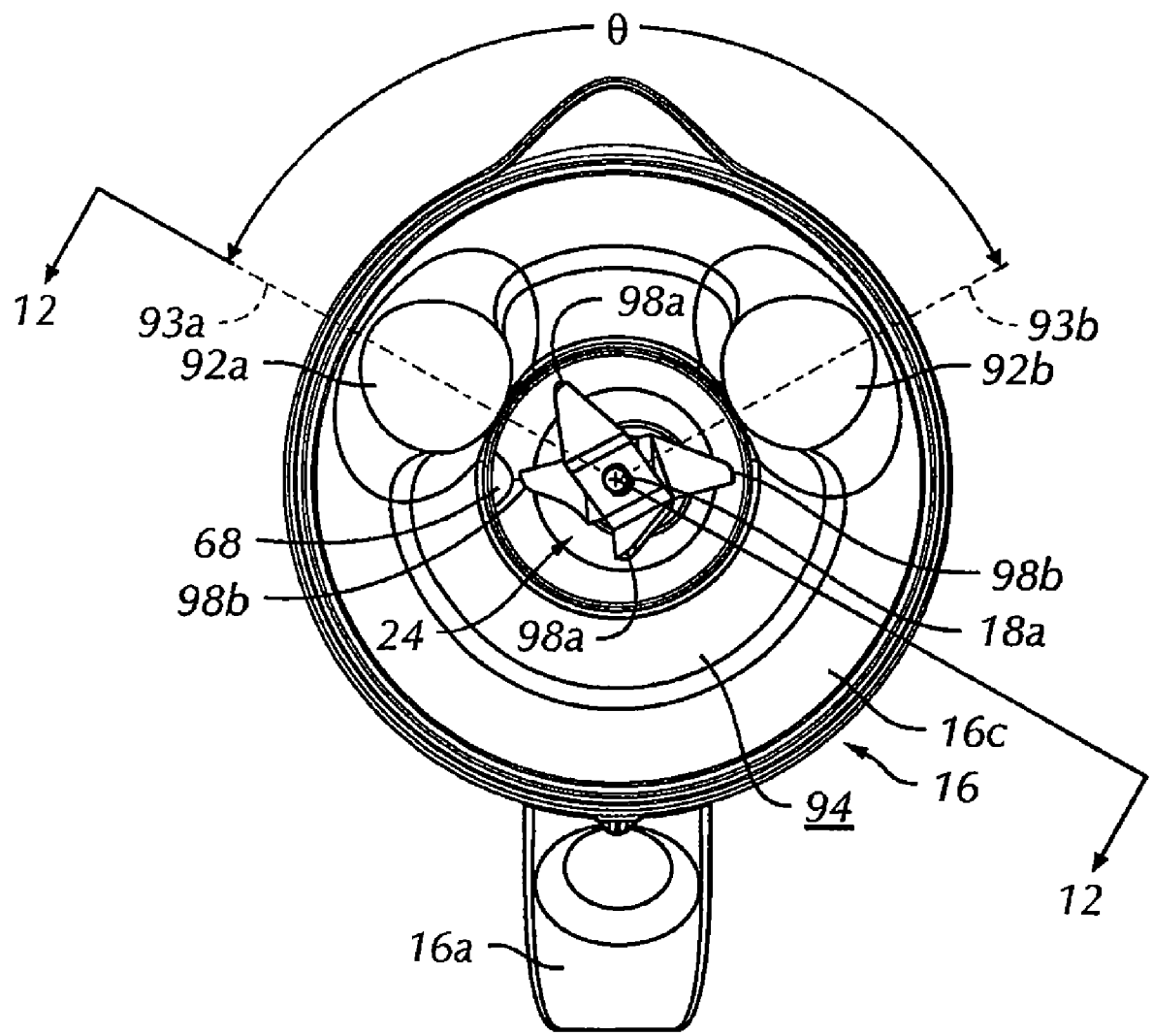
FIG. 9 is a top plan view of a container of the dispensing blender of FIG. 1.
Figure 10:
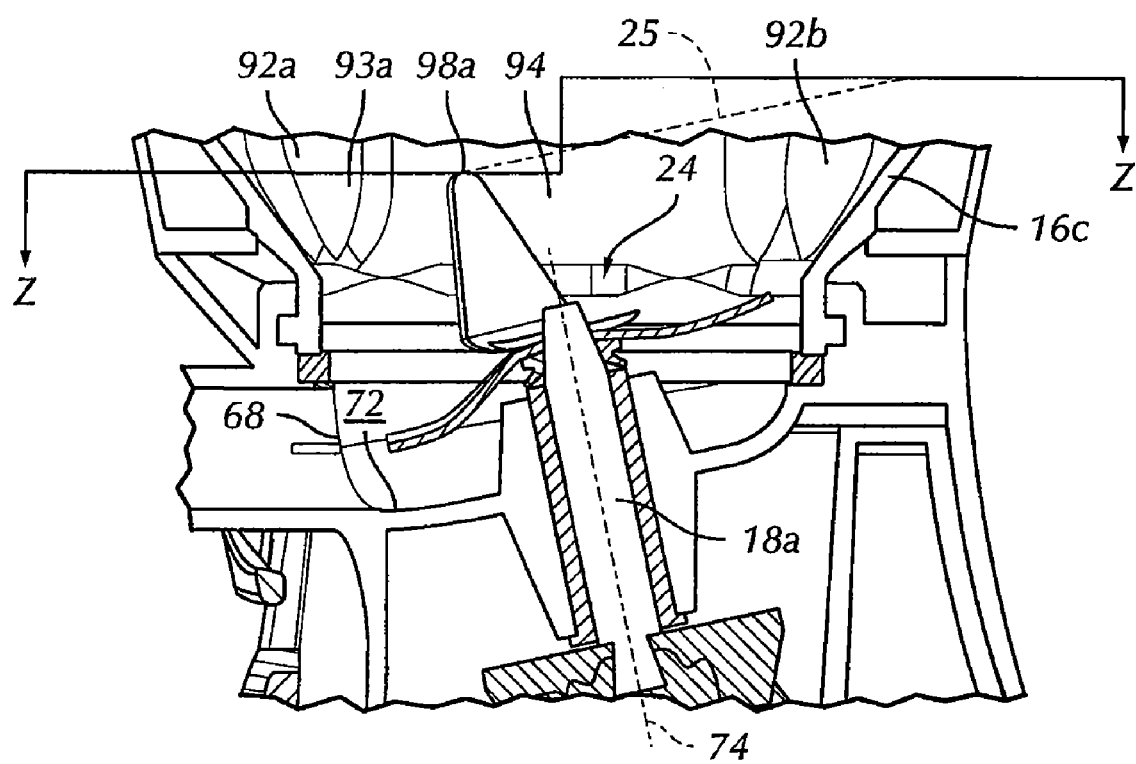
FIG. 10 is a greatly magnified cross-sectional view of the dispensing blender of FIG. 1, taken along line 3-3 of FIG. 1 showing a blending tool rotated such that an upwardly extending blade tip is in close proximity to a first bump of a blending jar.
Figure 11A:
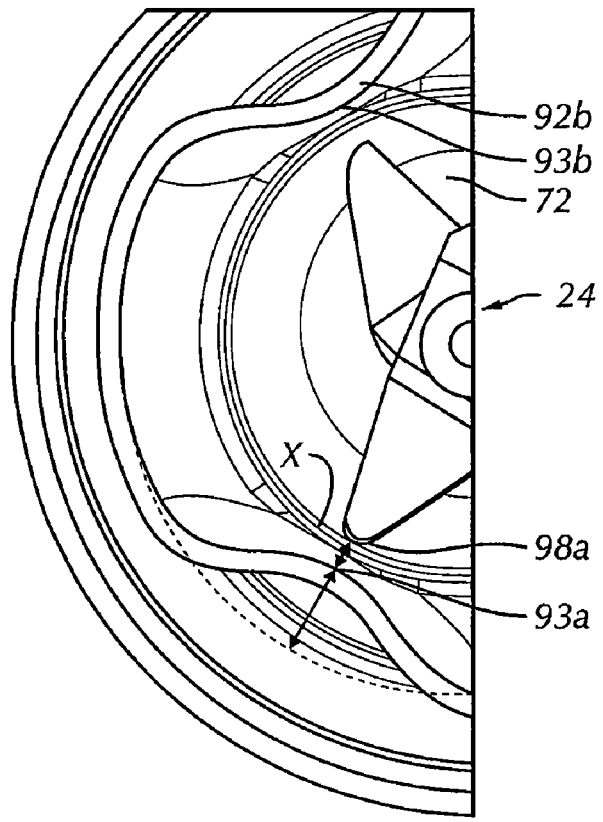
FIG. 11A is a cross-sectional view of the dispensing blender of FIG. 1, taken along line Z-Z of FIG. 10.
Figure 11B:
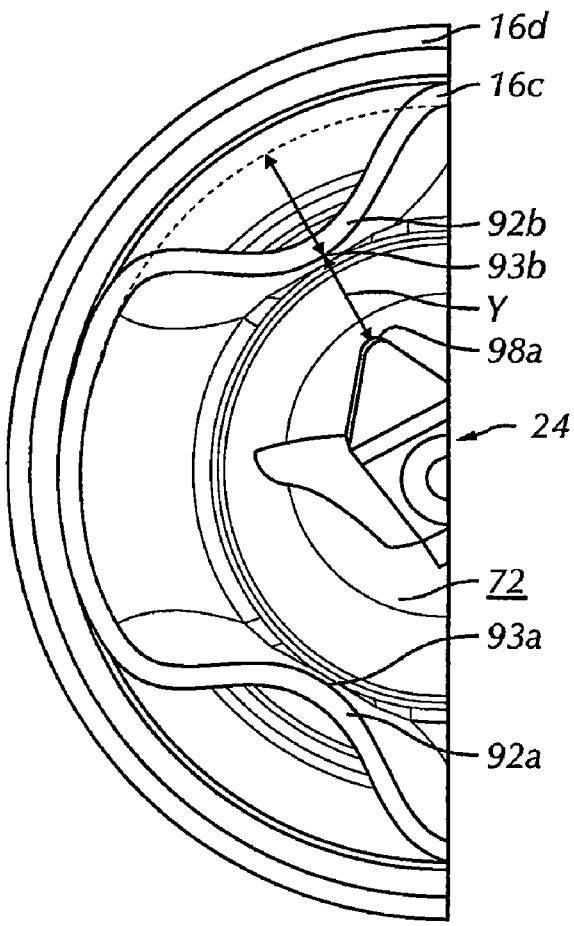
FIG. 11B is a cross-sectional view of the dispensing blender of FIG. 1, taken along line Z-Z of FIG. 10, wherein the blending tool is rotated such that the upwardly extending blade tip is in close proximity to a second bump of the blending jar.
Figure 12:
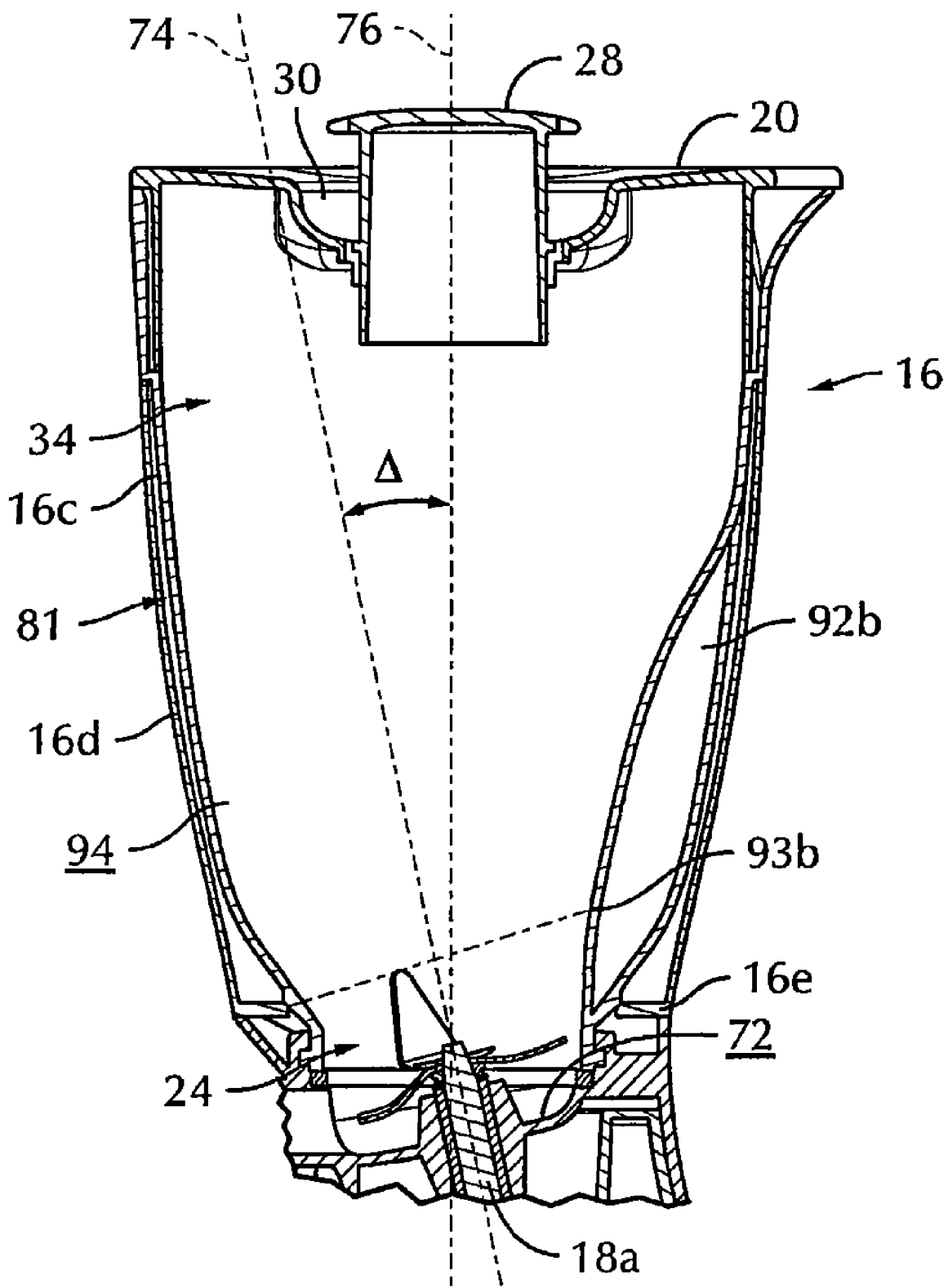
FIG. 12 is a cross-sectional view of the dispensing blender of FIG. 1, taken along line 12-12 of FIG. 9.

Referring to FIGS. 1A, 3 and 9, in the preferred embodiment, the inner jar 16c includes first and second bumps 92a, 92b extending radially inwardly from an internal surface 94 of the inner jar 16c toward a vertical axis 76, in the assembled configuration. The jar 16 is preferably concentrically mounted on the base 12 along the vertical axis 76. The bumps 92a, 92b extend upwardly from a lower portion of the inner jar 16c toward the mouth 16b and provide a surface discontinuity or obstacle on the inner surface of the jar 16. The bumps 92a, 92b preferably impart turbulence or otherwise alter the flow pattern in the blending foodstuff in the mixing cavity 34 to improve blending and mixing. In the preferred embodiments, the bumps 92a, 92b are spaced on the internal surface 94 at a bump angle θ relative to the vertical axis 76, in an assembled configuration. The preferred bump angle θ is approximately one hundred twenty degrees (120°) but is not so limited. The bumps 92a, 92b generally cooperate with the blending tool 24 to mix and agitate the foodstuff as it is blended in the jar 16.

The variable distance of the blade tips 98a, 98b relative to the internal surface 94 of the jar 16 and the inner humps 93a, 93b of the bumps 92a, 92b may also be accomplished by mounting the tool 24 on an off-center axis (not shown) that is generally parallel to the vertical axis 76 but not coaxial with the vertical axis 76. As the tool 24 rotates on the off-center axis, the blade tips 98a, 98b are located at a variable distance from the internal surface of the jar 16, as would be obvious to one having ordinary skill in the art. The variable distance of the blade tips 98a, 98b from the internal surface 94 of the jar 16, the inner humps 93a, 93b or an inner surface of the basin 18b may also favorably impact the flow characteristics of the foodstuff in the mixing cavity 34 when the dispensing blender 10 is in operation.

One having ordinary skill in the art will realize that the jar 16 is not limited to the inclusion of the bumps 92a, 92b or to the above-described spacing of the bumps 92a, 92b on the internal surface 94. The bumps 92a, 92b may be constructed to have nearly any shape and may be located at nearly any position on the internal surface 94 of the jar 16 within the mixing cavity 34 to cooperate with the blending tool 24 to mix and agitate the foodstuff. For example, the jar 16 may be constructed with a relatively smooth, continuous internal surface 94 without any bumps 92a, 92b or may be constructed with a plurality of bumps having various sizes and shapes positioned on the internal surface 94 or within the mixing cavity 34.

Referring to FIGS. 1-3 and 6, in the preferred embodiment, the cup relief section 60 is located in a front surface of the base 12 and has a generally concave shape that accommodates the pivotal movement of the cup actuation lever 56 and a cup (not shown) that is generally utilized to actuate the cup actuation lever 56. The cup may be used to actuate the cup actuation lever 56 by engaging and depressing the cup bumper 64 toward the base 12 and into the cup relief section 60. In the dispensing position, the cup bumper 64 is positioned in the cup relief section 60 and the cup is positioned under the mouth 32c of the dispensing spout 32.

Referring to FIGS. 3-5, in the preferred embodiment, the motor 14, motor shaft 14a and collar shaft 18a are aligned along the drive axis 74 and are pitched relative to the vertical axis 76. The motor 14 is preferably pitched toward a rear of the base 12, which provides clearance and space for the cup relief section 60 at the front of the base 12 when compared to a typical blender where the motor would be aligned or centered along the vertical axis 76. Accordingly, the rearward pitch of the motor 14 provides additional space for the movement of the cup actuation lever 56. Further, the additional space permits the dispensing spout 32 to be located comparatively close to the vertical axis 76 when compared to a conventional blender and shortens the distance between the hole 68 and the mouth 32c of the dispensing spout 32. It is preferred to have a relatively short distance between the hole 68 and the mouth 32c such that the distance that the blended foodstuff must flow through the channel 70 is limited, as will be understood by one having ordinary skill in the art.

Alignment of the motor 14, motor shaft 14a and collar shaft 18a along the pitched drive axis 74 also pitches the tool 24 relative to the vertical axis 76. Pitching of the drive axis 74 promotes formation of a vortex around the drive axis 74 as opposed to around the vertical axis 76. In a conventional blender having a tool that is aligned on the vertical axis 76, a vortex may form along the vertical axis 76, which is in alignment with a longitudinal axis of the conventional jar or container. The drive axis 74 is not in alignment with a longitudinal axis of the jar 16 and container 54 and formation of a vortex along the drive axis 74 offsets the vortex from the jar 16 and container 54 longitudinal axis, which is the vertical axis 76. Offsetting of the vortex in the jar 16 and container 54 typically results in additional turbulence in the flow of material in the mixing cavity 34 when compared to the typical vortex. This pitching of the vortex works in concert with the first and second bumps 92a, 92b to agitate and create turbulence in the blending foodstuff within the mixing cavity 34. Additional turbulence typically results in improved mixing results in the dispensing blender 10.

Referring to FIGS. 1-5, in operation, the jar 16 is assembled by sliding the upper end 82 of the outer jar 16d into contact with the locating ridge 84 of the inner jar 16c and twisting the outer jar 16d relative to the inner jar 16c such that the twist-lock tabs 86a, 86b engage. When the jar 16 is assembled, the terminal rib end 90a is preferably in at least partial facing engagement with the inner jar 16c closing the insulating cavity 81. The cup actuation lever 56 is mounted to the base 12 by snap-fitting the pivot nubs 56a into the yoke 62. The first actuation lever 38 is mounted to the dispensing spout 32 by engaging the actuation shaft 38c with the hub 40 and sliding the stop valve 36 into the dispensing head 32a such that the dispensing head 32a may be threadably engaged with the spout lid 32d. The dispensing spout 32 is mounted to the pipe 96 utilizing the fastening mechanism 33a. The jar 16 is mounted to the collar 18 with the bayonet-type lock such that the first coupling mechanism 48a engages the coupling tab 48b to form the container 54. When the jar 16 is mounted to the collar 18, the tab 90 is preferably in close proximity with the peripheral rim 88. The container 54 is mounted to the base 12 by engaging the second coupling mechanism 50 between the collar 18 and the base 12. Specifically, the peripheral wall 52 of the collar 18 engages the upwardly extending wall 26 of the base 12 such that the ends 26a of the upwardly extending wall 26 are seated in the transition between the concave section 52b and the semi-circular section 52a of the peripheral wall 52. When the container 54 is mounted to the base 12, the engagement end 56b of the cup actuation lever 56 is adjacent the lever end 38b of the first actuation lever 38 and the clutch 22 on the collar 18 is engaged with the motor clutch 14b. Foodstuff is inserted into the jar 16 through the mouth 16b, the lid 20 is positioned over the mouth 16b such that the foodstuff is enclosed in the container 54 and the cap 28 is inserted into the central hole 30. Additional foodstuff may be inserted into the mixing cavity 34 by removing the filler cap 28, inserting the foodstuff through the central hole 30 and replacing the filler cap 28.

The motor 14 is powered by plugging in an electric cord 55 and is actuated to drive the drive shaft 14a by depressing one of the buttons on the control panel 12a. The tool 24 is driven by the motor 14 through the collar shaft 18a, the clutch 22, the motor clutch 14b and the motor shaft 14a to blend the foodstuff. The blended and blending foodstuff is urged from the basin 18b toward the hole 68 by the force of gravity and by the urging of the tool 24, which includes at least one blending blade 24a that extends below the horizontal plane 78 proximate the hole 68. Specifically, the at least one downwardly extending blade tip 98b preferably extends to a mid-portion of the hole 68. The stop valve 36 generally prevents the blended and blending foodstuff from flowing out of the mouth 32c when the dispensing spout 32 is in the closed position. In addition, the pitch of the tool 24, which is aligned along the drive axis 74 and the inclusion of the first and second bumps 92a, 92b on the inner surface 94 of the inner jar 16c generally increase turbulence in the flow of foodstuff within the mixing cavity 34 and promote generally even mixing of the foodstuff.

To dispense foodstuff from the spout 32, a cup is engaged with the cup bumper 64, urging the cup bumper 64 toward the base 12 and causing the cup actuation lever 56 to pivot about the cup axis 58. The engagement end 56b moves away from the collar 18, urging the lever end 38b to move away from the collar 18 and causing the first actuation lever 38 to pivot about the first axis 44 such that the valve end 38a pivots upwardly and away from the dispensing spout 32. Pivoting of the valve end 38a away from the dispensing spout 32 urges the pin 42 and stop valve 36 upwardly in the dispensing head 32a and out of the channel 70 against the force of the spring 46. When the dispensing spout 32 is in this open position, the blended foodstuff may flow out of the mouth 32c and into the cup which is actuating the cup actuation lever 56. The pitched surface 72 urges blended foodstuff toward the hole 68 and channel 70 and the location of the hole 68 in the lowest portion of the basin 18b permits a majority of the foodstuff to flow into the channel 70. The tool 24 is actuated to rotate by the cup actuator lever 56 engaging the protective member 218 and push button actuator 216 when the dispensing spout 32 is in the open position to urge the blended foodstuff from the basin 18b into the channel 70 and out of the mouth 32c. Alternatively, the first actuation lever 38 may be manually pivoted such that the valve end 38a moves upwardly and the stop valve 36 moves out of the channel 70.

The container 54 may also be disengaged from the base 12 such that the blended foodstuff may be carried by a user in the container 54. When the container 54 is disengaged from the base 12, the cup actuation lever 56 is retained in the yoke 62 on the base 12 and the dispensing spout 32 and first actuation lever 38 are retained with the container 54 mounted to the collar 18. The generally planar second end 18d of the collar 18 may be positioned on a generally planar support surface to relieve the user from constantly carrying the blended foodstuff filled container 54. The container 54 is generally able to maintain the temperature of the blended foodstuff due to the insulating cavity 81 of the jar 16 and the container 54 may be transported without the base 12. In addition, the blended foodstuff may be dispensed from the dispensing spout 32 when the container 54 is removed from the base 12 by manually actuating the first actuation lever 38 such that the stop valve 36 moves out of the channel 70. When the container 54 is emptied of blended foodstuff, the container 54 may be refilled with ingredients and returned to the base 12 for additional blending.

It will be appreciated by those skilled in the art that changes could be made to the embodiment described above without departing from the broad inventive concept thereof. It is understood, therefore, that this invention is not limited to the particular embodiments disclosed, but is intended to cover modifications within the spirit and scope of the present invention as defined by the appended claims.

I claim:

1. A dispensing blender for blending foodstuff and dispensing foodstuff therefrom, the dispensing blender comprising:

a base enclosing a motor;

a container removably mountable to the base, the container being comprised of a jar and a collar removably mountable to each other, the collar being removably mounted between the jar and base in a working position;

a motor drive shaft that extends out of the base, the container including a clutch that releasably engages the drive shaft and a tool extending into the container in a working position, the tool being drivingly connected to the clutch such that rotation of the motor drive shaft results in rotation of the tool;

a dispensing spout mounted to the collar, the dispensing spout being actuatable to either an open position wherein foodstuff within the container is able to flow out of the dispensing spout and a closed position wherein the foodstuff is blocked from flowing out of the dispensing spout;

a cup actuation lever mounted to the base, the cup actuation lever being movable to a dispensing position wherein the dispensing spout is urged to the open position and a resting position wherein the dispensing spout is urged to the closed position; and a switch mounted to the base proximate to the cup actuation lever so that when the cup actuation lever is moved to the dispensing position the switch is actuated to a closed condition by the cup actuation lever, the switch being electrically connected so that actuation of the switch to the closed condition causes the motor to operate to thereby rotate the tool when the dispensing spout is in the open position and foodstuff is flowing out of the dispensing spout.

2. The dispensing blender of claim 1 wherein the cup actuation lever is pivotally mounted to the base.

3. The dispensing blender of claim 1 wherein the switch is a momentary push button switch having a housing and an actuator button extending outside of the base, the actuator button being depressed for closing the switch when the cup actuation lever is moved to the dispensing position.

4. The dispensing blender of claim 3 wherein the switch further includes a protective member covering the actuator button.

5. The dispensing blender of claim 4 wherein the protective member is comprised of an elastomeric material.

6. The dispensing blender of claim 1 wherein the switch includes a pair of electrical contacts which are electrically connected in parallel with a selected push button switch of a control panel of the blender.

* * * * *